United States Patent
Kornstaedt et al.

(10) Patent No.: US 8,271,963 B2
(45) Date of Patent: Sep. 18, 2012

(54) MIMICKING OF FUNCTIONALITY EXPOSED THROUGH AN ABSTRACTION

(75) Inventors: Leif Kornstaedt, Redmond, WA (US); Andrew Pardoe, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1338 days.

(21) Appl. No.: 11/941,986

(22) Filed: Nov. 19, 2007

(65) Prior Publication Data

US 2009/0132226 A1    May 21, 2009

(51) Int. Cl.
 *G06F 9/44* (2006.01)
(52) U.S. Cl. ......................................................... 717/135
(58) Field of Classification Search ................... 717/135, 717/175; 712/32; 703/22, 14; 709/201; 726/26; 714/45
See application file for complete search history.

(56) References Cited

U.S. PATENT DOCUMENTS

| | | | |
|---|---|---|---|
| 6,427,195 B1 | 7/2002 | McGowen et al. | |
| 6,470,424 B1 | 10/2002 | Adams | |
| 6,513,156 B2 | 1/2003 | Bak et al. | |
| 6,629,123 B1* | 9/2003 | Hunt | 718/106 |
| 6,675,261 B2 | 1/2004 | Shandony | |
| 6,842,894 B1 | 1/2005 | Havemose | |
| 8,015,543 B1* | 9/2011 | Carrick et al. | 717/106 |
| 2002/0016878 A1 | 2/2002 | Flores | |
| 2002/0184444 A1 | 12/2002 | Shandony | |
| 2005/0086652 A1 | 4/2005 | Tian et al. | |
| 2006/0023688 A1 | 2/2006 | Kilian-Kehr et al. | |
| 2006/0101522 A1* | 5/2006 | Rothwell et al. | 726/26 |
| 2006/0112374 A1 | 5/2006 | Oliva | |
| 2007/0067573 A1 | 3/2007 | Bruening et al. | |

OTHER PUBLICATIONS

International Search Report and Written Opinion Received for PCT Application No. PCT/US2008/083661, mailed on Jul. 13, 2009, 11 pages.
Adl-Tabatabai, et al., "Compiler and Runtime Support for Efficient Software Transactional Memory", Proceedings of the 2006 ACM SIGPLAN Conference on Programming Language Design and Implementation, Date: 2006, pp. 26-37.
Costa, et al.,"Speeding Up Thread-Local Storage Access in Dynamic Libraries in the ARM platform", pp. 1-14, GCC Developer's Summit (2006).
Powell, et al., "SunOS Multi-thread Architecture", Date: 1991, pp. 1-14, USENIX—Winter '91—Dallas, TX.
Schmidt, et al., "Thread-Specific Storage for C/C++", pp. 1-15, Sep. 1997.

* cited by examiner

*Primary Examiner* — Tuan A Vu
(74) *Attorney, Agent, or Firm* — Rau Patents, LLC (57) ABSTRACT

Various technologies and techniques are disclosed for mimicking functionality of an application platform. At runtime, an analysis is performed of an application platform to identify how a desired functionality is implemented by the application platform. When the analysis reveals that the application platform is using a known function that can be mimicked, a handshake with the application platform is bypassed and the desired functionality is mimicked. To mimic the functionality, the known function is started for the application platform that uses the desired functionality. An entry point of the known function is detected. Machine instructions are decoded in the known function. Code that mimics an effect of the machine instructions is generated. The code that mimics the effect of the machine instructions is then executed.

17 Claims, 6 Drawing Sheets

MIMICKING OF FUNCTIONALITY EXPOSED THROUGH AN ABSTRACTION

BACKGROUND

In computing, an application platform refers to a framework, either in hardware or software, which allows software to run. Typical platforms include a computer's architecture, an operating system, or programming languages and their runtime libraries. Thus, some examples of application platforms can include operating systems such as MICROSOFT® WINDOWS® or Linux, or runtime platforms such as MICROSOFT® .NET Framework and Java. It is common for an application platform to have data or resources that are private to the application platform. In such scenarios, if another application wants to use that same data, the application first has to communicate with the application platform to request the data, and then has to wait for the application platform to respond to the request.

An example of data that may be private to an application platform includes thread local storage. Thread local storage is a technique by which an operating system allows each thread to have its own private storage area for data. Access to the data for a given thread that is stored in the private storage area has to be performed through the operating system. This has a negative impact on the performance of the application that is using the thread local storage.

SUMMARY

Various technologies and techniques are disclosed for mimicking functionality of an application platform. At runtime, an analysis is performed of an application platform to identify how a desired functionality is implemented by the application platform. When the analysis reveals that the application platform is using a known function that can be mimicked, a handshake with the application platform is bypassed and the desired functionality is mimicked.

In one implementation, to mimic the functionality, a known function is started for an application platform that uses the desired functionality. An entry point of the known function is detected. Machine instructions are decoded in the known function. Code that mimics an effect of the machine instructions is generated. The code that mimics the effect of the machine instructions is then executed.

In one implementation, code that mimics an effect of machine instructions is generated by representing an effect of the decoded machine instructions as an abstract execution state. The decoded machine instructions are generated from the known function in the application platform that has the desired functionality that another application wishes to mimic. The abstract execution state is transformed into an abstract expression. Code is then generated from the abstract expression.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The technologies and techniques herein may be described in the general context as an application that mimics the functionality of an application platform, but the technologies and techniques also serve other purposes in addition to these. In one implementation, one or more of the techniques described herein can be implemented as features within any type of program or service that wants to access data or resources that are otherwise private to an application platform.

Figure 1:
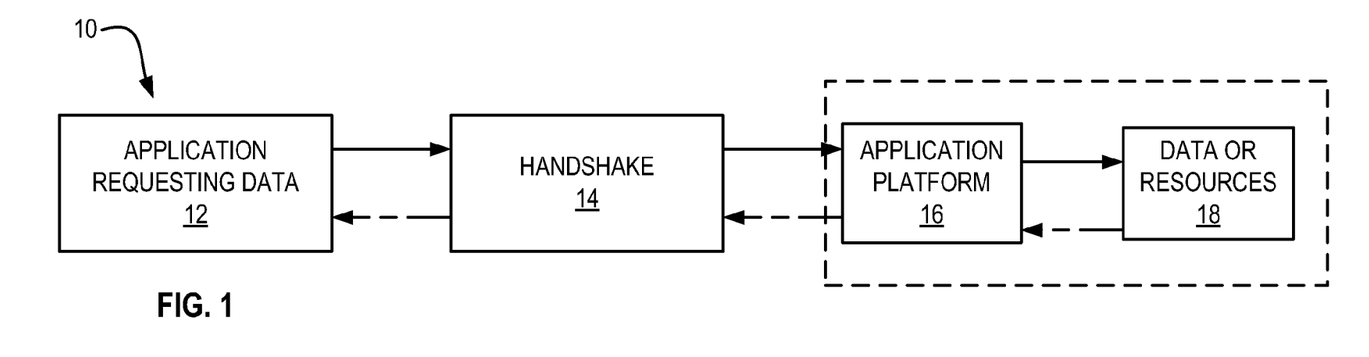
FIG. 1 is a diagrammatic view of a typical handshake for accessing data or resources private to an application platform.

FIG. 1 is a diagrammatic view of a typical handshake process 10 for accessing data or resources private to an application platform. As mentioned previously, when an application 12 wants to use data or resources 18 that are private to an application platform 16, the application 12 requesting data first has to communicate with the application platform 16 to request the data or resources 18, and then has to wait for the application platform to respond to the request. Before the request can be processed, the application 12 requesting data first has to establish a handshake 14 with the application platform 16. The term "handshake" as used herein is meant to include a mechanism by which an application can request a service to be executed by an application platform on behalf of the application. The handshake is what opens a communication channel between the application 12 requesting data and the application platform 16. Once the handshake 14 is established, then the request can be submitted to the application platform 16, the application platform can access the data or resources 18 to get the requested information, and return the data to the application 12 requesting data.

Figure 2:
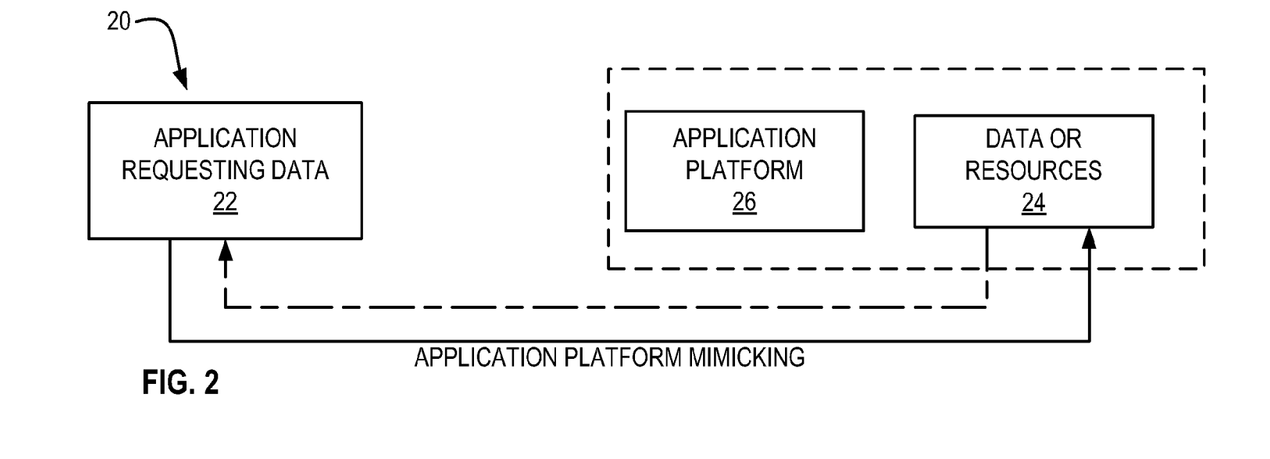
FIG. 2 is a diagrammatic view of mimicking application platform functionality to get to data or resources that are otherwise private to an application platform.

In one implementation, as shown in FIG. 2, a mimicking system 20 is provided that allows application platform functionality to be mimicked so that data or resources can be accessed by an application that would otherwise be private to an application platform. In the diagram shown in FIG. 2, the application 22 requesting data uses a mimicking technique to directly access the data or resources 24 that would otherwise have been private to the application platform 26. The term "mimic" as used herein is meant to include an execution of application code that has the same semantic effect as the application platform code that implements the service. The functionality of the application platform code being mimicked and the functionality of the application code are indistinguishable to an observer except for intended behavior changes such as better performance or added functionality.

One example where some or all of the mimicking techniques described herein can be used is with thread local storage. As noted earlier, thread local storage is a technique by which an operating system allows each thread to have its own private storage area for data. Access to the data for a given thread that is stored in the private storage area typically has to be performed through the operating system. Using some or all of the mimicking techniques described in further detail herein, the application 22 requesting data can directly access the data that is stored in thread local storage without having to go through the handshake and request process with the application platform (which would be the operating system in this example).

Turning now to FIGS. 3-6 with continued reference to FIG. 2, some techniques for implementing mimicking system 20 are described in further detail. In some implementations, the processes of FIG. 3-6 are at least partially implemented in the operating logic of computing device 500 (of FIG. 7).

Figure 3:
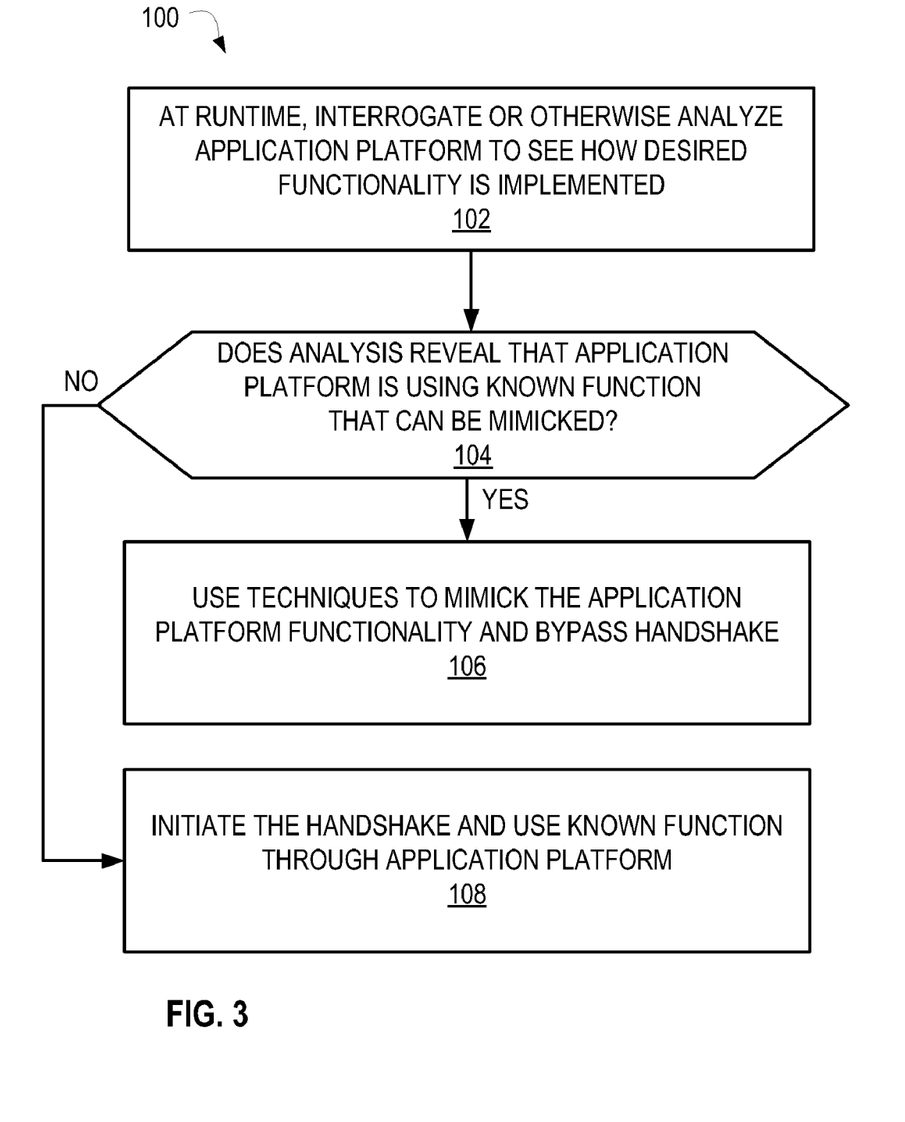
FIG. 3 is a process flow diagram for one implementation illustrating the high level stages involved in discovering and mimicking application platform functionality at runtime.

FIG. 3 is a process flow diagram 100 for one implementation illustrating the high level stages involved in discovering and mimicking application platform functionality at runtime. At runtime, an application platform is interrogated or otherwise analyzed to see how a particular functionality is implemented (stage 102). The particular functionality can be any functionality that is provided by an application platform that accesses private data or resources that another application now wants to access. If the analysis reveals that a known function is being used that can be mimicked (decision point 104), then techniques are used to mimic the application platform functionality and bypass the handshake (stage 106). The term "known function" as used herein is meant to include a function, procedure, routine, or other logic that can be executed separately from the application platform as a whole. The mimicking process is described in further detail in FIG. 4.

If the analysis does not reveal that the application platform is using a known function that can be mimicked (decision point 104), then the handshake is initiated with the application platform and the known function (described in FIG. 1) is used through the application platform to access the data or resources (as normal) (stage 108).

Figure 4:
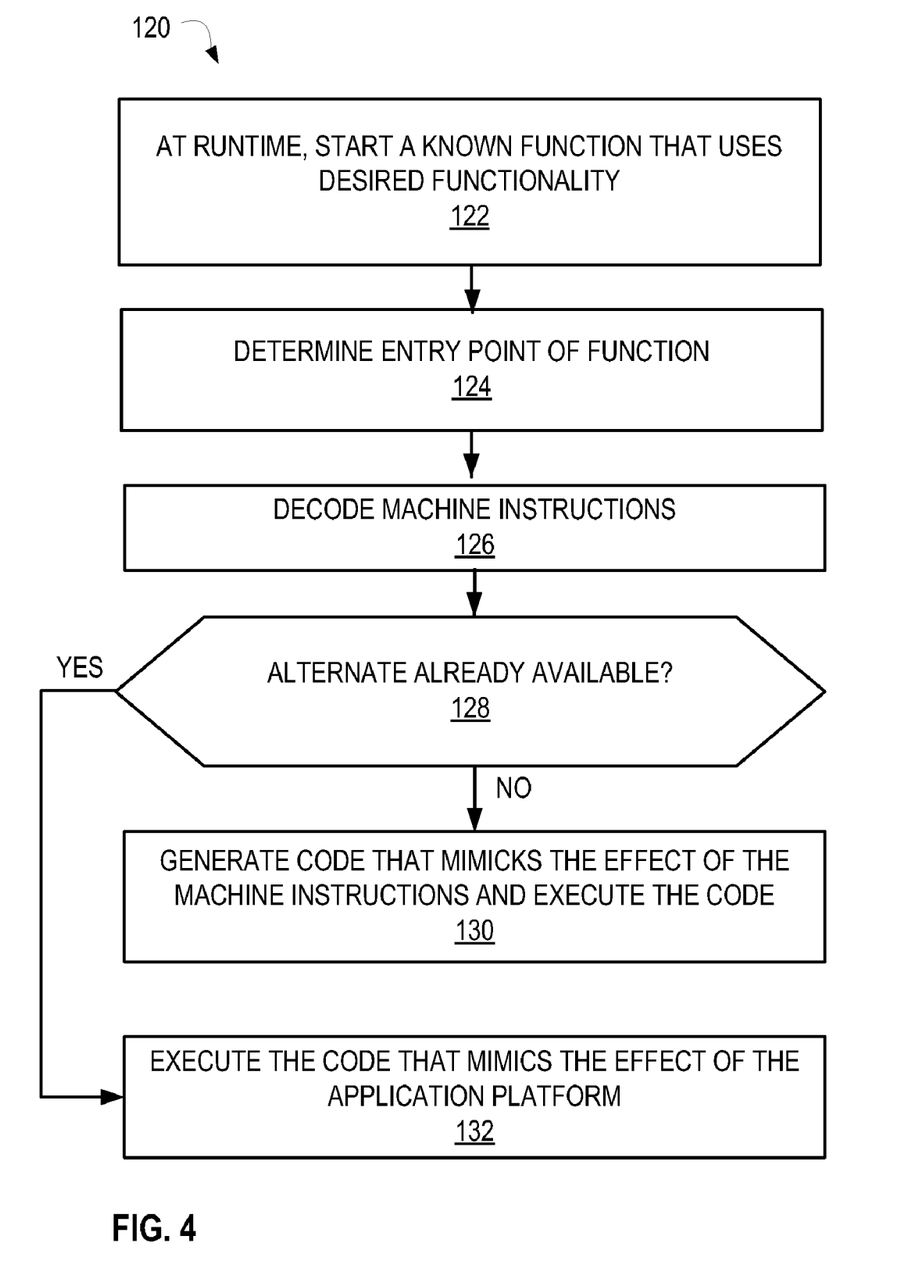
FIG. 4 is a process flow diagram for one implementation illustrating the stages involved in mimicking the discovered functionality of the application platform.

Turning now to FIG. 4, a process flow diagram 120 for one implementation is shown that illustrates the more detailed stages involved in mimicking the discovered functionality of the application platform. At runtime, a known function is started that uses the desired functionality, such as an accessor function in the case of thread local storage (stage 122). The system determines the entry point of the function, which is typically the address of the first machine instruction (stage 124). The machine instructions are decoded (stage 126). If an alternate function has not already been generated for mimicking the effects of the desired functionality (decision point 128), then code is generated that mimics the effect of the machine instructions, and the newly generated code is then executed (stage 132). This code generation process is described in further detail in FIG. 5. If an alternate function has already been generated (decision point 128), then the existing code that has already been generated is executed to mimic the effect of the application platform (stage 132).

Figure 5:
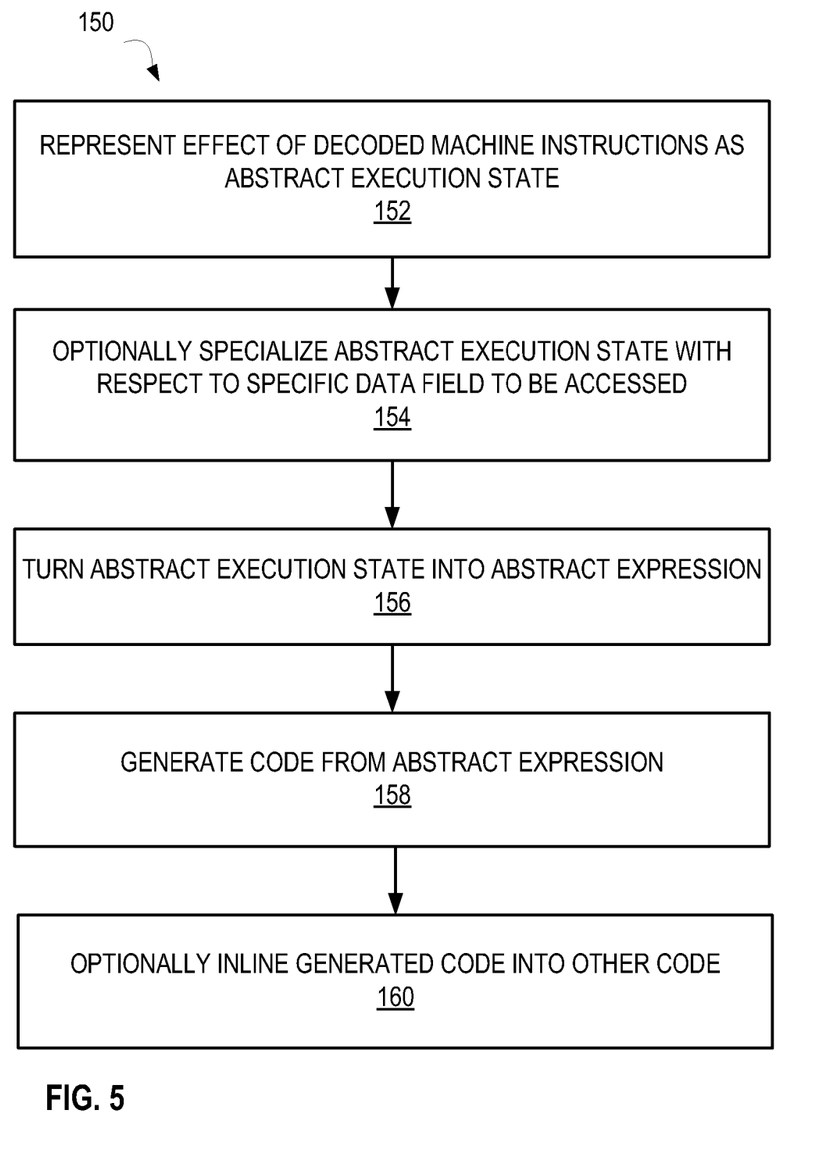
FIG. 5 is a process flow diagram for one implementation illustrating the stages involved in generating code that mimics the effect of the machine instructions.

FIG. 5 is a process flow diagram 150 that illustrates one implementation of the stages involved in generating code that mimics the effect of the machine instructions. The system represents the effect of the decoded machine instruction as an abstract execution state (stage 152). The term "abstract execution state" as used herein is meant to include facts about the program which independently reflect the state of the program at a given point in its execution. Facts needed to accurately represent program state include the semantic effects of instructions to be executed and the values of program data. A non-limiting example will now be discussed to further illustrate the concept of an abstract execution state. Suppose the interface specification of the application platform exposes a data accessor as a function called according to an Application Binary Interface or ABI. Suppose the ABI requires parameters such as the field offset to be written to memory (the machine stack) and some registers to be saved before the call (to the machine stack) and restored after the call. The execution state can include the values of the machine registers and stack slots. The application emulates the instructions in the application platform but does not carry them out on actual values and registers/stack slots. Instead, variables are used as placeholders instead of actual values, and the abstract execution state maps registers/stack slots to expressions involving those variables (as opposed to the actual value that would result from evaluating the abstract expressions using concrete values for the variables).

The abstract execution state is optionally specialized with respect to the specific data field to be accessed (stage 154). For example, information exists which is available to an application program at runtime that is not available to the application platform when it is compiled. The code is specialized by making use of this runtime information to create more efficient code. The abstract execution state is then turned into an abstract expression (stage 156), and code is then generated from the abstract expression (stage 158). The term "abstract expression" as used herein is meant to include a representation of a program including the semantic effects of its instructions and the program data. A code generator can take an abstract expression as input and generate code which, when executed, evaluates the expression with the program's specific data values to produce a state which is an instance of the state described by the abstract expression.

Figure 6:
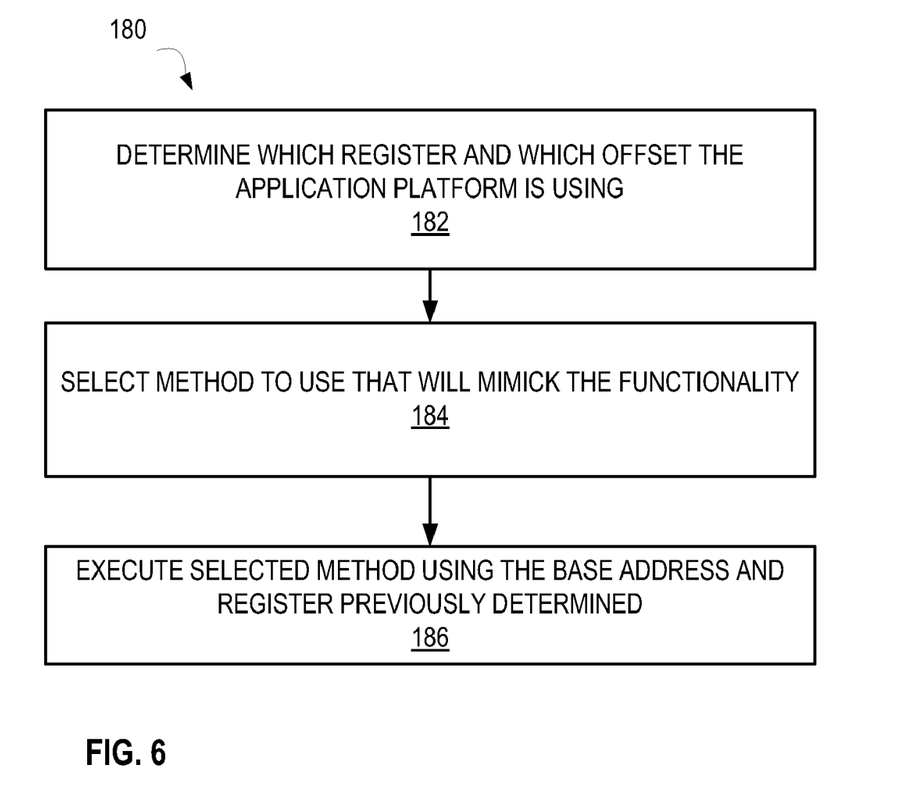
FIG. 6 is a process flow diagram for one implementation illustrating the stages involved in using mimicking in a scenario involving registers and register offsets.

Once code is generated from the abstract expression (stage 158), the code can optionally be inlined into the other code (stage 160). In-lining is a compiler optimization that can be performed to include lines of code directly in a program so that it is included as part of a compiled executable and thus faster than accessing the code from a separate library or executable. For example, the application that wants to mimic the functionality of the application platform can inline the code written to perform the mimicking directly with its other code to improve performance when executing the mimicked functionality. FIG. 6 is a process flow diagram 180 that illustrates one implementation of the stages involved in using mimicking in a scenario involving registers and register offsets. The system determines which register and which offset the application platform is using (stage 182) and selects a method to use that will mimic the functionality (stage 184). The selected method is then executed using the base address and the register that was previously determined to be used by the application platform (stage 186).

A non-limiting example will now be described to further illustrate the concept of registers and register offsets. A given operating system (which is an application platform) may reserve some machine registers, which means that application code is not allowed to use them for their own storage purposes. These machine registers would be used by the operating system for bookkeeping purposes and accessed by operating system functions. In the example of thread-local storage, a given machine register may be initialized on thread creation to point to the "thread environment block". The thread environment block is a structure that contains, at an offset determined by the operating system, a field that points to an array of slots for thread-local storage. To mimic an access to thread local storage, a determination would have to be made regarding which reserved machine register points to the thread environment block and at what offset the thread local storage slots reside. For example, MICROSOFT® WINDOWS® NT on the x86 platform would use the FS register to point to the thread environment block and the offset would be 3600+4*(thread local storage slot index) for the first 64 thread local storage slots. In the process described in FIG. 6, this base address and the FS register would be used to execute the selected method (stage 186).

Figure 7:
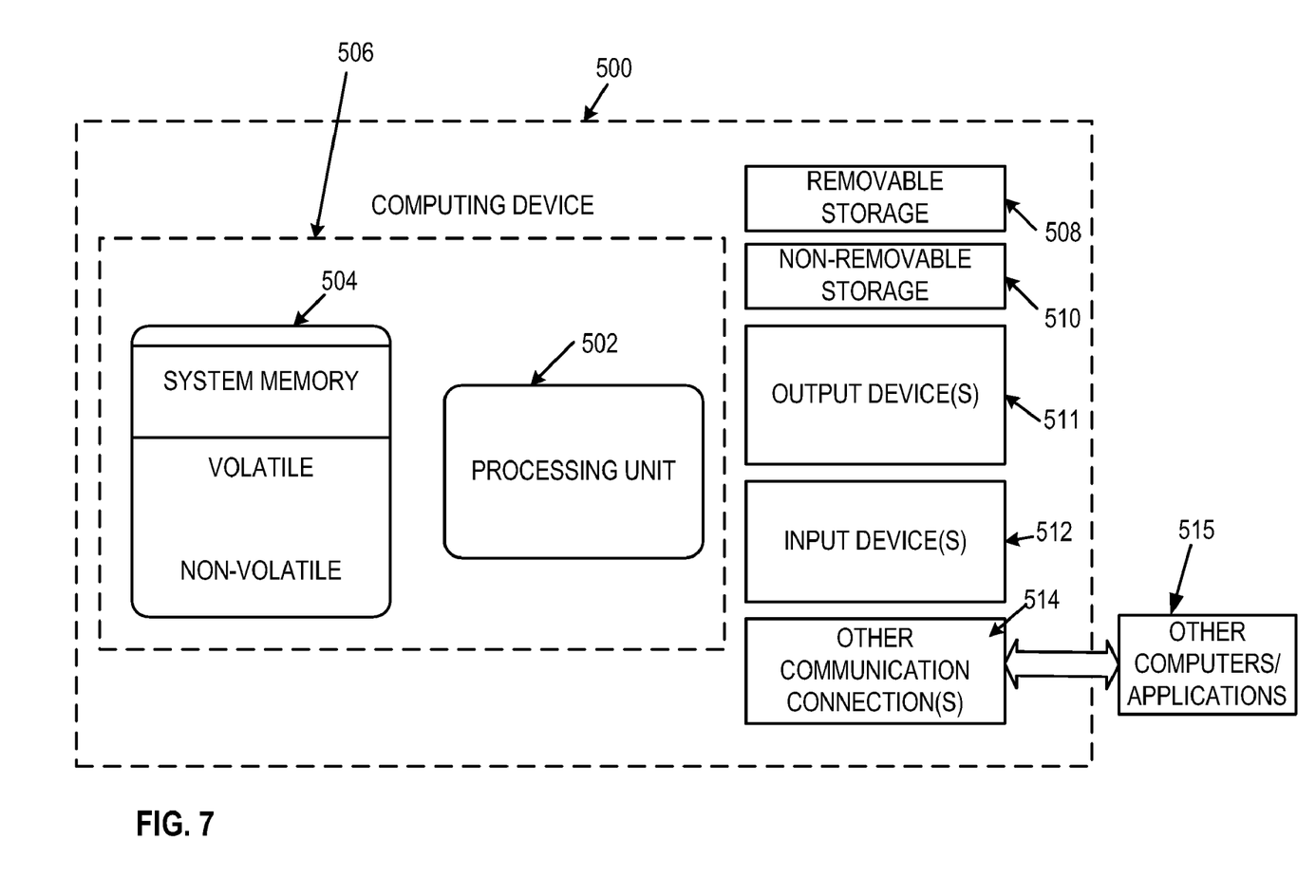
FIG. 7 is a diagrammatic view of a computer system of one implementation.

Turning now to FIG. 7, an exemplary computer system to use for implementing one or more parts of the system is shown that includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 7 by dashed line 506.

Additionally, device 500 may also have additional features/functionality. For example, device 500 may also include additional storage (removable and/or non-removable) including, but not limited to, magnetic or optical disks or tape. Such additional storage is illustrated in FIG. 7 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Computing device 500 includes one or more communication connections 514 that allow computing device 500 to communicate with other computers/applications 515. Device 500 may also have input device(s) 512 such as keyboard, mouse, pen, voice input device, touch input device, etc. Output device(s) 511 such as a display, speakers, printer, etc. may also be included. These devices are well known in the art and need not be discussed at length here.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A computer-readable medium having computer-executable instructions for causing a computer to implement generation of code used to bypass operating system's handshake required for an application to access thread local store information, to perform steps comprising:

at runtime, performing an analysis of an application platform to identify how a thread local storage is implemented by the application platform, the thread local storage having data or information related to an operating system underlying the application platform;

when the analysis reveals that the application platform is using a known function related to accessing or setting data allocated/implemented for the thread local storage that can be mimicked, then bypassing a handshake of the application platform with the operating system and mimicking the known function by:

representing an effect of decoded machine instructions of the known function as an abstract execution state, the abstract execution state mapping a machine register and/or a slack slot to expressions involving variables that are used as placeholders for actual values of machine registers and stack slots;

transforming the abstract execution state into an abstract expression, the abstract expression being a program representation including semantic effects of instructions and program data; and generating code that mimics the effect of the machine instructions of the known function from the abstract expression.

2. The computer-readable medium of claim 1, further having computer-executable instructions for causing a computer to perform steps comprising:

when the analysis reveals that the application platform is not using a known function that can be mimicked, then initiating the handshake with the application platform and using the thread local storage through the application platform.

3. The computer-readable medium of claim 1, wherein the mimicking of the thread local storage step comprises the steps of:

starting the known function of the application platform; determining an entry point of the known function; and executing the code that mimics the effect of the machine instructions of the known function.

4. The computer-readable medium of claim 1, wherein the mimicking the thread local storage step comprises the steps of:

identifying a register and a register offset that the application platform is using to implement the thread local storage; and executing a method designed to mimic the thread local storage by using a base address and the register that was identified.

5. The computer-readable medium of claim 4, further having computer-executable instructions for causing a computer to perform steps comprising: selecting the method designed to mimic the thread local storage from a plurality of available methods.

6. The computer-readable medium of claim 1, wherein the known function is an accessor function.

7. The computer readable medium of claim 1 wherein the known function is called according to an Application Binary Interface (ABI).

8. A method for mimicking functionality of an application platform at runtime comprising the steps of:

analyzing a known function related to accessing or setting data allocated/implemented for a thread local storage of the application platform at runtime that uses the thread local storage, the thread local storage having data or information related to an operating system underlying the application platform; and determining if the known function can be mimicked, then bypassing a handshake of the application with the operating system by mimicking the known function and mimicking the known function by:

determining an entry point of the known function;

decoding machine instructions in the known function, representing an effect of the decoded machine instructions of the known function as an abstract execution state, the abstract execution state mapping a machine register and/or a slack slot to expressions involving variables that are used as placeholders for actual values of machine registers and stack slots;

transforming the abstract execution state into an abstract expression, the abstract expression being a program representation including semantic effects of instructions and program data;

generating code that mimics an effect of the machine instructions of the known function from the abstract expression; and executing the code that mimics the effect of the machine instructions of the known function.

9. The method of claim 8, wherein the generating step is performed when the code has not previously been generated to mimic the effect of the machine instructions.

10. The method of claim 8, wherein the known function is an accessor function.

11. The method of claim 8, wherein the entry point of the known function is determined as a first machine instruction of the machine instructions in the known function.

12. The method of claim 8, further comprising:
prior to executing the code, inlining the code that mimics the effect with other code to achieve a faster execution performance.

13. A method for generating code that mimics an effect of machine instructions comprising the steps of:
during an application platform runtime, analyzing a known function related to accessing or setting data allocated/implemented for a thread local storage of the platform runtime that uses the thread local storage, the thread local storage having data or information related to an operating system underlying the application platform; and determining if the known function can be mimicked, then bypassing a handshake of the application runtime with the operating system and mimicking the known function by:

representing a decoded machine instructions of the known function as an abstract execution state, the abstract execution state mapping a machine register and/or a slack slot to expressions involving variables that are used as placeholders for actual values of machine registers and stack slots, the decoded machine instructions having been generated for the known function related to accessing or setting data in the thread local storage that the runtime application desires to mimic, the thread local storage having data or information related to an operating system underlying the application platform;

transforming the abstract execution state into an abstract expression, the abstract expression being a program representation including semantic effects of instructions and program data; and generating code that mimics the effect of the machine instructions of the known function from the abstract expression.

14. The method of claim 13, further comprising:
prior to transforming the abstract execution state, specializing the abstract execution state to a specific data field to be accessed.

15. The method of claim 13, further comprising:
inlining the generated code into the runtime application code.

16. The method of claim 15, wherein the generated code is inlined directly into one or any other application that is mimicking the known function.

17. The method of claim 16, wherein the generated code is inlined directly into one or any other application to improve a performance of the one or any other application when mimicking the known function.

* * * * *